United States Patent
Di Silvestro et al.

(10) Patent No.: US 6,525,166 B1
(45) Date of Patent: Feb. 25, 2003

(54) POLYAMIDES WITH HIGH FLUIDITY, METHOD FOR MAKING SAME, COMPOSITIONS SAID POLYAMIDE

(75) Inventors: Giuseppe Di Silvestro, I-Lentate Sul Seveso (IT); Franco Speroni, Ceriano Laghetto (IT); Cuiming Yuan, Milan (IT); Haichun Zhang, Saronno (IT)

(73) Assignee: Nyltech Italia S.r.l., Ceriano Laghetto (IT)

( * ) Notice: Subject to any disclaimer, the term of this patent is extended or adjusted under 35 U.S.C. 154(b) by 0 days.

(21) Appl. No.: 09/719,299

(22) PCT Filed: May 25, 1999

(86) PCT No.: PCT/EP99/03612

§ 371 (c)(1),
(2), (4) Date: Mar. 26, 2001

(87) PCT Pub. No.: WO99/64496

PCT Pub. Date: Dec. 16, 1999

(30) Foreign Application Priority Data

Jun. 11, 1998  (FR) .............................. 98 07533

(51) Int. Cl.$^7$ ........................ C08G 69/04; C08G 69/36; C08G 69/02; C08L 77/00
(52) U.S. Cl. ...................... 528/310; 528/170; 528/312; 528/322; 528/323; 528/326; 528/332; 528/335; 528/336; 524/433; 524/443; 524/444; 524/451; 524/600; 524/606
(58) Field of Search .................. 528/310, 170, 528/312, 322, 332, 323, 326, 335, 336; 524/600, 606, 433, 443, 444, 451

(56) References Cited

U.S. PATENT DOCUMENTS

| | | | | |
|---|---|---|---|---|
| 2,863,857 A | * | 12/1958 | Costain et al. ............... | 528/310 |
| 4,435,548 A | * | 3/1984 | Tomalia et al. .............. | 525/451 |
| 5,859,148 A | * | 1/1999 | Borggreve et al. .......... | 525/420 |
| 6,160,080 A | * | 12/2000 | Cucinella et al. ........... | 528/170 |

FOREIGN PATENT DOCUMENTS

| | | | |
|---|---|---|---|
| DE | 43 12 182 | * | 10/1993 |
| EP | 0 377 259 | * | 7/1990 |
| FR | 2 743 077 | * | 7/1997 |
| WO | 97 46747 | * | 12/1997 |
| WO | WO 01/96474 A1 | * | 12/2001 |

OTHER PUBLICATIONS

Schaefgen J.R. et al, "Synthesis of Multichain Polymers and Investigation of Their Viscosities", Journal of the American Chemical Society, vol. 70, No. 8, Aug. 1948, pp. 2709–2718, XP 000654891, cited in the application, p. 2713.*

* cited by examiner

Primary Examiner—P. Hampton-Hightower
(74) Attorney, Agent, or Firm—Burns, Doane, Swecker & Mathis, L.L.P.

(57) ABSTRACT

The invention concerns a polyamide comprising macromolecular chains having a star-shaped configuration, a method for making said polyamide and compositions comprising same. More particularly, the invention concerns a method for making a polyamide comprising linear macromolecular chains and star-shaped macromolecular chains with control of the star-shaped chain concentration in the polymer. Said control is obtained by using besides the polyfunctional polymers and amino acids or lactams a polyfunctional comonomer comprising either acid functions or amine functions. The resulting polyamide has optimal mechanical and rheological properties for improving the speed and quality of mould filling and producing mouldable compositions comprising high filler factors.

17 Claims, No Drawings

POLYAMIDES WITH HIGH FLUIDITY, METHOD FOR MAKING SAME, COMPOSITIONS SAID POLYAMIDE

The invention relates to a polyamide comprising macromolecular chains exhibiting a star configuration, to a process for the manufacture of this polyamide and to the compositions comprising this copolyamide.

Recent years have seen the development of polyamides with a branched structure and of polyamides comprising structures of star type. These polyamides can be used for the manufacture of various articles, such as films, yarns, fibres or moulded articles, which may or may not comprise fillers.

However, P. J. Flory had from 1948 (JACS 70, 2709–18, 1948) studied the synthesis of a star polyamide by polymerization of ε-caprolactam with a compound comprising four acidic functional groups, namely tetracarboxypropylcyclohexanone. The results of these studies and the Theological and mechanical properties of these star polyamides were studied and confirmed by T. M. Warakonisky (Chem. Mat. 4-1000–4 1992 and U.S. Pat. No. 4,435,548). Thus, Warakonisky confirmed the decrease in the viscosity of the material in the molten state for similar molecular masses but also showed a significant decrease in the mechanical properties with respect to those of a linear polyamide.

In patent application Ser. No. 2,743,077, the Applicant Company has disclosed a process for the manufacture of a polyamide comprising a mixture of chains of star type and of linear chains. Such a polyamide exhibits a much higher fluidity in a molten medium than that of the linear polyamide with an equivalent molecular mass but, unlike the star polyamides disclosed by Flory and Warakonisky, it exhibits mechanical properties of an equivalent level to that of the linear polyamides with an equivalent molecular mass.

As is disclosed in the abovementioned patent application Ser. No. 2,743,077, this polyamide makes possible the production of moulded articles exhibiting complex shapes over narrow or thin parts. In addition, compositions comprising a high level of bulking or reinforcing fillers are manufactured and can be used in conventional moulding processes.

These advantageous mechanical and Theological properties are obtained in particular when the number-average molecular mass of the polyamide is greater than 15,000 and a concentration by number of linear chains is between 10 and 50%, preferably between 15 and 30%.

The concentration of the linear chain or of a chain of star type can be determined according to a method developed by Farina et al. and presented during the 4th Italian Convention on the Science of the report of this congress.

In short, this method makes it possible to calculate the ratio by mass $X_W$ of star polymer in the polyamide by determination of the concentration of amine and/or acid end groups. In the case of the presence of a polyfunctional compound (for example, of a polycarboxyl compound), the value $X_W$ can be defined by the following relationship:

$$X_W = ([COOH] - [NH_2])/[COOH]$$

The polydispersity index D represented by $$\frac{\overline{Mw}}{\overline{Mn}}$$

can be greater than or less than 2, depending on the degree of conversion of the polymer.

According to the process disclosed in patent application Ser. No. 2,743,077, the concentration of star polyamide and thus the fluidity in a molten medium of the polymer is determined, on the one hand, by the polyfunctional monomer/caprolactam ratio and, on the other hand, by the duration of the polymerization process.

As the range of concentration of star polyamide for which the mechanical and rheological properties are optimum for the desired application is relatively narrow, the industrial manufacture of such a polyamide requires procedures for managing and controlling the plant which are very difficult to employ in a reliable way.

In particular, in an industrial process, it is very difficult to exert precise control over the achievement, during the polymerization stage, of a degree of conversion corresponding to the desired ratio by mass $X_w$ of star structure.

One of the aims of the present invention is, in particular, to provide a novel process for the manufacture of polyamides comprising chains of star structure and linear chains which makes it possible to easily control the concentration of star chains during the polymerization.

To this end, the invention provides a process for the manufacture of a polyamide comprising macromolecular chains of star structure and linear macromolecular chains which consist in polycondensing a mixture of monomers comprising at least:

a) monomers of following general formula (I):

(I)

b) monomers of following general formulae (IIa) and (IIb):

(IIa)

(IIb)

c) monomers of following general formula (III):

(III)

in which formulae:

$R_1$ is a linear or cyclic, aromatic or aliphatic, hydrocarbon-comprising radical comprising at least two carbon atoms and which can comprise heteroatoms, A is a covalent bond or an aliphatic hydrocarbon-comprising radical comprising from 1 to 6 carbon atoms, Z represents a primary amine radical or a carboxyl group, $R_2$ and $R_3$, which are identical or different, represent substituted or unsubstituted, aliphatic, cycloaliphatic or aromatic, hydrocarbon-comprising radicals comprising from 2 to 20 carbon atoms, and which can comprise heteroatoms, Y is a primary amine radical when X represents a carboxyl radical, or Y is a carboxyl radical when X represents a primary amine radical, M is an integer between 3 and 8.

The molar concentration of the monomers of formula (I) in the mixture of monomers is between 0.1% and 2% and that of the monomers of formula (III) is between 0.1% and 2%, the remainder to 100% corresponding to the monomers of general formulae (IIa) or (IIb). The polymerization reaction is advantageously carried out until the maximum degree of polymerization is achieved, optionally in the presence of a polycondensation initiator.

Furthermore, according to a preferred characteristic of the invention, the molar ratio of the monomers of formula (I) to the monomers of formula (III) is between 2 and 8. Under these conditions, the process of the invention makes it possible to obtain, reliably and industrially, a polymer comprising a concentration of chains of star type which is optimal for the desired mechanical and rheological properties.

Thus, this concentration by number of chains of star type is advantageously between 50 and 90%, preferably between 70 and 85%.

According to the invention, the monomer of general formula (I) comprises a radical $R_1$ which can advantageously be a trivalent radical of phenyl or cyclohexanyl type, which may or may not be substituted, tetravalent diaminopolymethylene radicals with a number of methylene groups advantageously of between 2 and 12, such as the radical originating from EDTA (ethylenediaminetetraacetic acid), octovalent cyclohexanonyl or cyclohexadinonyl radicals, or radicals originating from compounds resulting from the reaction of polyols, such as glycerol, sorbitol, mannitol or pentaerythritol, with acrylonitrile.

The preferred radicals $R_1$ of the invention are the cycloaliphatic radicals, such as the tetravalent cyclohexanonyl radical.

The radical A is preferably a methylene or polymethylene radical, such as the ethylene, propylene or butylene radicals.

According to a preferred embodiment of the invention, the letter m represents an integer greater than 3, advantageously equal to 4, 5 or 6.

According to another characteristic of the invention, the radical $R_3$ of general formula (III) represents polymethylene radicals which can comprise from 2 to 36 carbon atoms or cycloaliphatic or aromatic radicals.

Mention may be made, by way of example, as compound of formula (III), of succinic acid, adipic acid, terephthalic acid, isophthalic acid, sebacic acid, azelaic acid, dodecanoic acid, fatty acid dimers or di (β-carboxyethyl)cyclohexanone.

Mention may also be made of diamine compounds, such as hexamethylenediamine, 5-methylpentamethylenediamine, metaxylylenediamine, isophoronediamine or 1,4-diaminocyclohexane.

The monomers of formula (II) are advantageously lactams or amino acids, such as ε-caprolactam, lauryllactam and their ω-amino acid.

According to the invention, the polycondensation is carried out in the presence of a polycondensation initiator conventionally used in the synthesis of polyamides by polycondensation of a lactam or of an amino acid, such as the synthesis of polycaproamide.

Mention may be made, by way of example, of water and inorganic acids.

This initiator is advantageously added at a concentration by weight in the mixture of monomers of between 0.01 and 5%.

The polycondensation is carried out according to processing conditions commonly used for the polycondensation of amino acids or lactams without polyfunctional compounds of formula (I).

Thus, the polycondensation process briefly comprises:

Heating the mixture of the monomers of formulae (I) to (III), with stirring and under pressure, with the polycondensation initiator (generally water), Maintaining the mixture at this temperature for a predetermined period of time and then decompressing and maintaining under a stream of inert gas (for example nitrogen) for a predetermined period of time at a temperature greater than the melting point of the mixture, in order thus to continue the polycondensation by removal of the water formed.

According to the present invention, the molar concentration of linear chains or chains of star type is determined by the ratio of the difunctional compounds of formula (III) to the multifunctional compounds of formula (I). Consequently, the polymerization is carried out until a maximum molecular mass is obtained.

Of course, the molar concentration of chains of star type is also determined by the molar concentration of multifunctional monomer of formula (I) in the mixture of monomers.

Furthermore, the molecular weight of the polymer is determined by the molar concentration of the multifunctional monomers of formula (I) and of the difunctional monomers of formula (IIa) or (IIb).

The model for calculating the concentration of chains of star type used was the Farina model described above. This model is a static model which takes into consideration only and exclusively all the linear chains and all the chains of star type present in the final polymer. The ratio $X_w$ defined above is taken into account.

However, the polymerization process is a dynamic process in which, before achieving complete conversion to the polymer, the reaction mixture comprises a mixture of molecular chains of different types, such as those corresponding to a reaction with one, two or three functional groups of the polyfunctional monomer. Thus, in the case of a tetracarboxyl monomer, the reaction mixture comprises chains in which one, two or three carboxyl functional groups have not reacted.

The model proposed by Yuan, which will be published subsequently in a scientific journal, takes into consideration the presence of these various molecular chains and the dynamic change in the latter.

Thus, with this model, it is possible to calculate the true amount of linear chains in the polymer for any degree of conversion.

In the Yuan dynamic model, a dynamic variable $X_d$, corresponding to the functional degree of conversion of a polyfunctional monomer, is defined by the following expression:

$$X_d = 1 - \frac{[COOH]}{nT_0 + N_0}$$

in which:

$T_0$ represents the number of moles of polyfunctional monomer T of formula (I)

n represents the functionality of the polyfunctional monomer T $N_0$ represents the number of initial moles of monomer N of formula (IIa) or (IIb).

The number-average degree of polymerization $DP_n$ is given by the following expression:

$$DP_n = \frac{N_0}{N_0(1 - X_d) - nT_0X_d + T_0[1 - (1 - X_d)^n]}$$

The mass-average degree of polymerization $DP_w$ is expressed according to the following relationship:

$$DP_w = 1 + \frac{2X_d}{1-X_d} + 12\frac{T_0}{N_0}\left(\frac{X_d}{1-X_d}\right)^2$$

The molar concentration of chains of star type in the polymer, PS, expressed as % with respect to the total number of chains, is given by the following expression:

$$PS = \frac{nT_0X_d^3(1-X_d) + T_0X_d^4}{N_0(1-X_d) - nT_0X_d + T_0[1-(1-X_d)^4]} \times 100$$

In the case of the invention, the above expressions are modified in order to take into account the presence of the difunctional monomers R of formula (III).

Thus, the expressions can be written as follows, a tetrafunctional monomer being taken into consideration as polyfunctional monomer T:

$$X_d = 1 - \frac{[COOH]}{2R_0 + 4T_0 + N_0}$$

$$DP_n = \frac{N_0}{N_0(1-X_d) + 2R_0X_d - 4T_0X_d + R_0[1-(1-X_d)^2] + T_0[1-(1-X_d)^4]}$$

$$DP_w = 1 + \frac{2X_d}{1-X_d} + 2\left(\frac{R_0}{N_0} + 6\frac{T_0}{N_0}\right)\left(\frac{X_d}{1-X_d}\right)^2$$

$$PS = \frac{4T_0X_d^3(1-X_d) + T_0X_d^4}{N_0(1-X_d) - 2R_0X_d - 4T_0X_d + R_0[1-(1-X_d)^2] + T_0[1-(1-X_d)^4]} \times 100$$

In these expressions $R_0$ represents the initial molar concentration of monomer of formula (III).

Finally, the degree of distribution D of the chains is given by the following relationship:

$$D = \frac{DP_w}{DP_n}$$

The process of the invention therefore makes it possible to obtain a polyamide of predetermined molecular weight by determination of the molar concentration of the multifunctional monomers of formula (I) and difunctional monomers of formula (III) in the mixture of monomers and with a star-type chain/linear chain ratio by number controlled by the molar ratio between these two types of monomers, for a polymerization carried out until thermodynamic equilibrium of the reaction is achieved.

Thus, the process for the manufacture of polyamides comprising a mixture of chains of star type and of linear chains can be easily carried out and makes possible the manufacture, reproducibly and industrially, of polyamides exhibiting the desired optimum Theological and mechanical properties.

Another subject-matter of the invention is a polyamide obtained by the reaction of the mixture of monomers which are described above.

This polyamide can be used for the production of moulded articles by standard processing techniques, such as extrusion, injection or spinning, for example.

Thus, the polymer emerging from polycondensation can be fed directly to one of the processes listed above or, more advantageously, the polymer is shaped as granules, after optionally mixing with other components, in order for it to be used as starting material in the feeding of shaping processes.

For example, the polymer is advantageously cooled with water and extruded in the form of rods. These rods are subsequently cut up in order to produce the granules.

In order to remove uncondensed monomers, in particular in the case where the monomer of formula (IIb) is caprolactam, the granules are washed with water and then dried under vacuum.

The polyamide of the invention is advantageously used as element or component of a thermoplastic matrix of a composition intended to be shaped for the manufacture of moulded items.

Such a composition is also the subject-matter of the invention.

According to the invention, the composition comprises a polymeric matrix, advantageously made of thermoplastic, and fillers which modify the properties of the matrix, such as its mechanical, flame-retardant or thermal, electrical or magnetic conductivity properties, or the like. Mention may be made, as examples of conventional fillers, of reinforcing fillers or bulking fillers.

According to the invention, the polymeric matrix comprises, as sole constituent or otherwise, the polyamide in accordance with the invention.

As the polyamide in accordance with the invention exhibits a higher melt flow index than known linear polyamides, for similar molecular masses and mechanical properties, the filler-comprising composition can be injected more readily into a mould, that is to say at higher rates. The composition also makes it possible to achieve more homogeneous and complete filling of the moulds, in particular when the latter have a complex shape.

The polyamide of the invention also makes it possible to prepare compositions comprising a high level of fillers which can be equal to up to 80% by weight with respect to the total composition.

Such a composition can be injected by virtue of the high melt flow index of the polyamide of the invention. The mechanical properties of this composition are high because they are generally improved when the level of filler increases.

Mention may be made, as bulking or reinforcing fillers which are suitable for the invention, of the fillers conventionally used to reinforce polymeric compositions, such as fibrous fillers comprising inorganic fibres, such as, for example, glass fibres, carbon fibres, ceramic fibres or fibres made of synthetic material, such as polyaramide fibres, powder fillers, such as talc, montmorillonite or kaolin, or glass beads and shells, for example.

Powder fillers are also used to improve the flame retardancy of the composition. Such fillers are, for example, metallic compounds, such as magnesium hydroxide or aluminium hydroxide.

Glass fibres are the preferred reinforcing filler of the invention.

According to another preferred characteristic of the invention, the polymeric matrix of the composition is composed of a mixture of the polyamide according to the invention with one or more other polymers, preferably polyamides or copolyamides.

Mention may be made, as preferred other polymers of the invention, of semicrystalline or amorphous polyamides, such as aliphatic polyamides, semi-aromatic polyamides and more generally linear polyamides obtained by polycondensation between an aromatic or aliphatic saturated diacid and an aliphatic or aromatic saturated primary diamine, a lactam, an amino acid or a mixture of these various monomers.

Mention may be made, by way of example, as other polymers, of poly(hexamethyleneadipamide), polyphthalamides obtained from terephthalic and/or isophthalic acid, such as the polyamide sold under the tradename Amodel, or copolyamides obtained from adipic acid, hexamethylenediamine and caprolactam.

In this embodiment, the concentration by weight in the matrix of polyamide according to the invention can vary within a wide range and is advantageously between 30 and 80% of the total mass of polymeric matrix.

The compositions of the invention can also comprise any conventional additive, such as flame retardants, heat and light stabilizers, waxes, pigments or the like.

Such compositions are used to prepare moulded items for the automobile industry, the connector industry, electrical components or accessories for various activities, such as sports activities or leisure activities, for example.

Other details and advantages of the invention will become more clearly apparent in the light of the examples given below solely by way of indication and illustration.

EXAMPLE 1

Synthesis of a Polyamide in Accordance with the Invention

The polymerization is carried out in a heated autoclave comprising stirring means.

4444 g of caprolactam and 61 g of 2,2,6,6-tetra (β-carboxyethyl)cyclohexanone are added to the autoclave with 160 g of distilled water and 5.6 g of adipic acid.

The cyclohexanone compound and its process of synthesis are described in the article "The Chemistry of Acrylonitrile II—Reactions with Ketones" JACS 64 2850 (1942) by Herman Alexander Buison and Thomas W. Riener.

The mixture, placed under stirring, is heated at a temperature of 265° C. under 6 bar.

It is maintained at this temperature and pressure for 2 hours.

The concentration of star chain, PS, is calculated according to the Yuan model described above.

The results and properties of the polyamide obtained are collated in Table I below.

EXAMPLE 2

Example 1 is repeated using the propylenediaminetetraacetic acid (DPTA) monomer as polyfunctional monomer.

The molar concentrations of tetrafunctional and difunctional monomers are identical, as well as the difunctional monomer/tetrafunctional monomer ratio.

The properties and composition of the polyamide obtained are also shown in Table I below.

COMPARATIVE EXAMPLES

Comparatives Examples A, B and C are also shown in Table I.

Example A corresponds to a polyamide obtained with the monomers of Example 1, with the exception of the absent adipic acid. The concentration of chains of star type is equal to approximately 80%.

Example B is also obtained with the monomers of Example 1, with the exception of adipic acid. The concentration of chains of star type is equal to approximately 100%.

Examples A and B correspond to the polyamides disclosed in patent application Ser. No. 2,743,077.

Example C corresponds to a polycaproamide obtained by polymerization of ε-caprolactam. The concentration of chains of star type is zero.

TABLE I

| | Examples | | | | |
|---|---|---|---|---|---|
| | 1 | 2 | A | B | C |
| Monomers | | | | | |
| Caprolactam (molar %) | 95 | 95 | 95 | 95 | 100 |
| Multifunctional monomer (molar %) | 0.4 | 0.4 | 0.5 | 0.5 | — |
| Difunctional monomer (molar %) | 0.1 | 0.1 | — | — | — |
| Degree of conversion | 100% | 100% | 80% | 100% | — |
| Structural properties | | | | | |
| $\overline{Mn}$ | 22601 | 22601 | 18669 | 21722 | 19550 |
| $\overline{Mw}$ | 30107 | 30107 | 26102 | 27904 | 39000 |
| PS (%) | 80 | 80 | 82.5 | 95.9 | 0 |
| PL (%) | 20 | 20 | 17.5 | 4.1 | 100 |
| $NH_2$ terminal functial groups (meq/g) | 7.2 | 14.5 | 18 | 12 | 48 |
| COOH terminal functional groups (meq/g) | 179 | 184 | 161 | 180 | 95 |
| Rheological and mechanical properties | | | | | |
| Relative viscosity (1) | 2.27 | 2.2 | 2.16 | 2.05 | 2.7 |
| Fluidity index in a molten medium (g/10 min) (2) | 28 | 31 | 33 | 45 | 4 |
| Notched Izod impact (J/m) | 5.2 | 5.3 | 5.8 | 3.2 | 5.5 |
| Modulus (MPa) | 2694 | 2608 | 2706 | 2420 | 2750 |
| Tensile strength (MPa) | 75 | 77 | 76 | 65 | 75 |

(1) Relative viscosity measured from a 1% solution of polymer in 96% $H_2SO_4$
(2) Melt flow index (MFI) determined according to ASTM Standard D1238

These results clearly illustrate that the process of the invention makes it possible to obtain a polymer with rheological and mechanical properties similar to those of the polymer obtained in the comparative example for which the degree of conversion to star polymer was 80%. However, the preparation process is easy to control.

Filler-comprising Compositions

Compositions comprising a polyamide matrix are charged with glass fibres by mixing in the molten state in a twin-screw extruder of Werner and Pfleiderer ZSK 40 type.

Thus, compositions comprising 50% by weight of glass fibres are prepared respectively with a polyamide in accordance with the invention exhibiting a ratio by mass of star polymer equal to 0.80 (Example 1), a star polyamide with a ratio by mass equal to 0.96 (Example B) or a conventional PA 6 (Example C).

The parameters for carrying out the mixing and the extruding are collated in the following Table II:

TABLE II

| Matrix | Polyamide Example C | Polyamide Example 1 | Polyamide Example B |
|---|---|---|---|
| Extrusion temperature | 250° C. | 240° C. | 240° C. |
| Rotational speed of the screw (rev. per min.) | 260 | 260 | 260 |
| Composition throughput (kg/h) | 40 | 40 | 40 |
| Torque of the motor (N.m) | 42 | 25 | 23 |
| Motor power absorbed, expressed in amperes (A) | 34 | 27 | 25 |

The properties of these compositions are collated in Table III below.

TABLE III

| Matrix | Polyamide Example 1 | Polyamide Example B | Polyamide Example C |
|---|---|---|---|
| Modulus (MPa) | 15500 | 15300 | 14200 |
| Fluidity index in a molten medium g/10 min | 18 | 15 | 7 |
| Notched Izod impact (J/m) | 12.8 | 13.3 | 16.6 |
| Unnotched Izod impact (MPa) | 81 | 84.2 | 81.2 |
| HDT (° C.) (1) | 202 | 204 | 203 |
| Spiral test (cm) (2) | 75 | 60 | 36 |

(1) Measured according to ASTM Standard D648 under a load 1.82 N/mm²
(2) This test consists in injecting the composition into a spiral-shaped mould with a thickness of 1 mm and a width of 40 mm under a Battenfeld press of 180 tonnes at a temperature of 270° C., a mould temperature of 80° C. and an injection pressure of 80 Kg/cm². The duration of injection if 1.5 seconds. The result of the test is determined by the length of mould correctly filled with the composition.

(1) Measured according to ASTM Standard D648 under a load 1.82 N/mm²
(2) This test consists in injecting the composition into a spiral-shaped mould with a thickness of 1 mm and a width of 40 mm under a Battenfeld press of 180 tonnes at a temperature of 270° C., a mould temperature of 80° C. and an injection pressure of 80 Kg/cm². The duration of injection if 1.5 seconds. The result of the test is determined by the length of mould correctly filled with the composition.

What is claimed is:

1. Process for the manufacture of a polyamide comprising linear macromolecular chains and macromolecular chains of star configuration, comprising carrying out the polymerization of a mixture of monomers comprising at least:

a) monomers of following general formula (I):

$$R_1-[A-Z]_m \quad (I)$$

b) monomers of following general formulae (IIa) and (IIb):

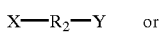
$$X-R_2-Y \quad \text{or} \quad (IIa)$$

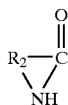
$$(IIb)$$

c) monomers of following general formula (III):

$$Z-R_3-Z \quad (III)$$

in which formulae:
$R_1$ is a linear or cyclic, aromatic or aliphatic, hydrocarbon-comprising radical comprising at least two carbon atoms and which can comprise heteroatoms,
A is a covalent bond or an aliphatic hydrocarbon-comprising radical comprising from 1 to 6 carbon atoms,
Z represents a primary amine radical or a carboxyl group,
$R_2$ and $R_3$, which are identical or different, represent substituted or unsubstituted, aliphatic, cycloaliphatic or aromatic, hydrocarbon-comprising radicals comprising from 2 to 20 carbon atoms, and which can comprise heteroatoms,
Y is a primary amine radical when X represents a carboxyl radical, or
Y is a carboxyl radical when X represents a primary amine radical,
M is an integer between 3 and 8, and in that the polymerization is carried out until thermodynamic equilibrium is achieved.

2. Process according to claim 1, wherein the molar concentration of monomers of formula (I) is between 0.1% and 2%, expressed as molar % with respect to all the monomers, and the molar concentration of monomers of formula (III) is between 0.1% and 2%, the remainder to 100% being composed of the monomers of formula (IIa) or (IIb).

3. Process according to claim 1, wherein the molar ratio of the monomers of formula (I) to the monomers of formula (III) is between 2 and 8.

4. Process according to claim 1, wherein it is carried out in the presence of a polycondensation initiating agent.

5. Process according to claim 1, wherein the radical $R_1$ is a cyclohexanonyl radical.

6. Process according to claim 1, wherein $R_3$ is a polymethylene radical comprising from 1 to 36 carbon atoms.

7. Process according to claim 1, characterized in that the monomer of formula (IIb) is ϵ-caprolactam.

8. Polyamide which can be obtained according to the process described in claim 1, comprising a percentage by number of macromolecular chains of star configuration of between 50% and 90%.

9. Composition comprising a polymeric matrix and fillers, wherein the polymeric matrix comprises at least one polyamide which can be obtained by a process according to claim 1.

10. Composition which comprises a polymeric matrix composed of a polyamide which can be obtained according to claim 1.

11. Composition which comprises a polymetric matrix composed of a mixture of a linear polyamide and of a polyamide which can be obtained by a process according to claim 1.

12. Composition comprising the polyamide according to claim 1, at a concentration by weight of between 30% and 80% with respect to the total mass of the polymeric matrix.

13. Composition according to claim 11, wherein the linear polyamide is selected from the group consisting of polyamides obtained by polycondensation between an aromatic or aliphatic saturated diacid and an aliphatic or aromatic saturated primary diamine, a lactam, an amino acid or a mixture of these various monomers.

14. Composition according to claim 13, wherein the linear polyamide is an aliphatic and/or semicrystalline polyamide or copolyamide selected from the group comprising PA-66, PA-6, PA-4,6 or PA-12 or a semicrystalline semiaromatic polyamide or copolyamide selected from the group comprising polyphthalamides.

15. Composition according to claim 9, wherein the concentration by weight of filler is less than 80% by weight of the composition.

16. Composition according to claims 9, wherein the fillers are reinforcing or bulking fillers selected from the group comprising fibrous fillers, fibres made of thermosetting material, and powder fillers.

17. Composition according to claim 9, wherein the fillers are flame-retardant fillers.

* * * * *